United States Patent [19]

Fitch et al.

[11] 4,186,088
[45] Jan. 29, 1980

[54] AQUEOUS FERROUS WASTE CONVERSION PROCESS

[75] Inventors: Steven J. Fitch, Baltimore; Philip R. Peeling, Finksburg; David J. Heiser, Severna Park, all of Md.

[73] Assignee: SCM Corporation, Cleveland, Ohio

[21] Appl. No.: 876,870

[22] Filed: Feb. 13, 1978

[51] Int. Cl.² ............................................... C02B 1/20
[52] U.S. Cl. ......................................... 210/45; 210/46; 423/142
[58] Field of Search ...................... 210/46, 45, 56, 47, 210/49, 44, 42 R, 51, 52, 53, 48; 423/140, 142, 147, 146, DIG. 2

[56] References Cited

U.S. PATENT DOCUMENTS

| 3,375,066 | 3/1968 | Murakami et al. | 423/DIG. 2 |
| 3,617,559 | 11/1971 | Cywin | 210/48 |
| 3,849,535 | 11/1974 | Irani | 423/140 |

FOREIGN PATENT DOCUMENTS 2630363  2/1977  Fed. Rep. of Germany.

OTHER PUBLICATIONS

Knowles C. L.; "Waste Pickle Liquors;" Steel (Industry Week); vol. 104, No. 20 (1939).
Hoak R. D.; "Waste Pickle Liquor;" Industrial & Engin. Chem.; vol. 39, p. 614, May 1947.

*Primary Examiner*—Benoît Castel
*Attorney, Agent, or Firm*—Gordon P. Becker; Merton H. Douthitt; Jerry K. Mueller, Jr.

[57] ABSTRACT

An aqueous ferrous sulfate waste stream is converted into sludge and improved water effluent by a preferably ambient indoor temperature and pressure flow process comprising: turbulently mixing said stream with a substantial excess of gaseous oxygen and a small excess of impalpable calcium carbonate in a reaction zone until the iron content of said stream is virtually all sludged; classifying resulting sludge into a coarser solids fraction (a portion of which is recycled to the sludging operation) and an aqueous suspension of finer solids; and separating finer solids from such aqueous suspension. As such streams usually contain free sulfuric acid, it is desirable to first precipitate from the stream a primary gypsum product by neutralization prior to such sludging operation.

13 Claims, 1 Drawing Figure

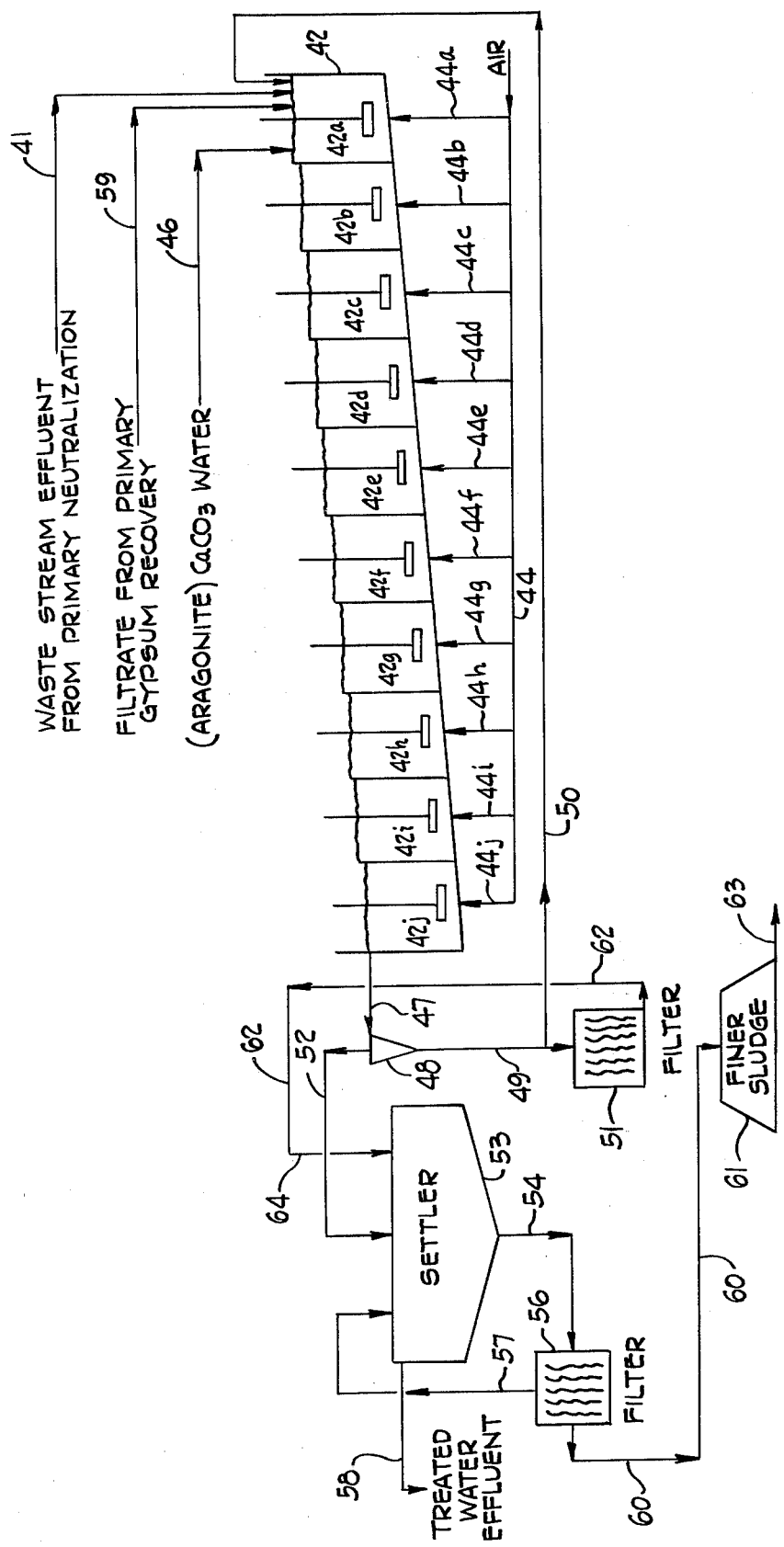

AQUEOUS FERROUS WASTE CONVERSION PROCESS

BACKGROUND OF THE INVENTION

This invention relates to an aqueous ferrous sulfate waste conversion process, and more particularly to the treatment of such waste for obtaining water effluent that meets economically today's stringent quality standards.

Such aqueous wastes often are effluvia from manufacturing plants practicing the so-called "sulfate process" for making pigmentary titanium dioxide. In such process titaniferous ore, slag, and mixtures of same initially are digested with sulfuric acid and, after a series of operations, pigmentary TiO$_2$ is recovered. Some aqueous mine wastes also can be candidates for the process; usually they are very dilute in ferrous sulfate (parts-per-million range), so they represent a marginal operation at best. Ferrous sulfate-containing waste pickle liquors from the etching of steel usually are much richer in ferrous sulfate than is a typical moderately dilute (about 0.1-3.5% by weight ferrous sulfate) composite stream from a TiO$_2$ sulfate process. Such pickle liquors often contain 10-20% ferrous sulfate, and initially the sludging reaction in accordance with this invention can be much faster because of this.

Patent Class 210 sets forth a number of previously-proposed treating methods broadly related to the instant one. Practical, sustained commercial operation in accordance with such methods appears now to be non-existent for pickle liquors and mine wastes, and is even fairly rare in the pigmentary TiO$_2$ industry.

The instant process has the advantage over prior suggestions by being more efficient or more economical either in facilities, utilities, reactants, or a combination of these elements per unit volume of waste handled. It is adaptable especially to medium scale operations (up to about 1,000 gallons [3,785 liters] per minute) handling wastes containing ferrous sulfate in concentration above a modest parts-per-million range, e.g. about 0.1-3.5%, although such percentage can be higher. While meeting local water quality standards is imperative for such process, there is very little besides possibly byproduct gypsum and carbon dioxide in certain cases that has any market value from such processing. Accordingly, efficiency and economy, with special emphasis on the latter attribute, is expected to be the deciding factor in process selection, providing of course that the aqueous effluent from the process attains quality standards (not substantially above 1 ppm of ferrous iron often is called for).

THE DRAWING

The drawing is a flow diagram showing the basis of design of a processing plant for treating about 645 gallons per minute of aqueous ferrous waste stream from a sulfate process titanium dioxide plant. It will be described in detail in the example which follows. Valves, fittings, instrumentation, controls, pumps, compressors, gas collectors, surge tanks, holding basins, standby equipment and many bypasses are not shown, but are to be installed in conventional manner where necessary or desirable.

BROAD STATEMENT OF THE INVENTION

The instant process is for the treatment of an aqueous ferrous sulfate waste stream, and it comprises: turbulently mixing said stream with a flow of coarser sludge solids from a later stage of the process, impalpable calcium carbonate in small stoichiometric excess, and molecular oxygen gas in substantial excess of the stoichiometric proportions required for converting the ferrous iron present in said stream into ferric iron in a slurry reaction zone until virtually complete sludging of the iron content of said stream takes place; continuously classifying the resulting sludge into a coarser solids fraction and an aqueous suspension of finer solids; returning a portion of the coarser solids fraction as said recycled flow; separating finer solids from said aqueous suspension; and disposing of as effluent the remainder of said aqueous suspension.

DETAILED DESCRIPTION OF THE INVENTION

An idealized net chemical equation for the process can be written as follows (actually, there is evidence that hydrolysis of ferric iron to Fe(OH)$_3$ is incomplete, and some basic ferric sulfates occur with correspondingly less CaCO$_3$ consumed and CO$_2$ and gypsum released while also the sludge can retain some small amount of ferrous iron):

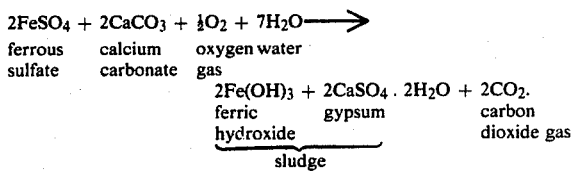

$$2FeSO_4 + 2CaCO_3 + \tfrac{1}{2}O_2 + 7H_2O \longrightarrow$$
ferrous    calcium    oxygen water
sulfate    carbonate  gas $$\underbrace{2Fe(OH)_3 + 2CaSO_4 \cdot 2H_2O}_{\text{sludge}} + 2CO_2.$$
ferric         gypsum         carbon
hydroxide                      dioxide gas However, this equation is adequate for practical operating purposes, and from this equation it is readily seen: that a "stoichiometric" amount of oxygen gas relative to the ferrous sulfate content of the waste is $\tfrac{1}{4}$ mol O$_2$ per mol of ferrous sulfate fed, and in this specification that is what is meant by a stoichiometric proportion of oxygen; also that "stoichiometric" for the calcium carbonate relative to ferrous sulfate would appear to be equimolar. However, as most of such aqueous ferrous wastes are acidic, a stoichiometric proportion of calcium carbonate for the instant specification means the calcium carbonate needed to neutralize completely all free acid in such waste fed to the sludging reactor series plus the mol of calcium carbonate per mol of ferrous sulfate called for by the above equation.

While the above equation indicates formation of ferric hydroxide, such hydroxide also can be considered as hydrated ferric oxide, and it should be understood that small proportions of iron having lower valence can be included in the sludge without appreciable detrimental effect. The ferric material has a strong tendency to flocculate solids for convenient disposal.

The waste stream fed to the process often contains free sulfuric acid; in such instance it can be of advantage to practice a primary neutralization on the stream with calcium carbonate to make "chemical gypsum" for various more or less exacting uses such as wallboard, plaster-of-Paris, etc. The effluent from such primary neutralization, or the whole waste stream itself (if no primary neutralization is practiced) is fed to the process.

While oxygen for the process can be supplied by oxygen-enriched air or even gaseous tonnage oxygen, if available, it is much cheaper and efficient to use ordinary atmospheric air for this purpose, and that is preferred. The air or other molecular oxygen-bearing gas used must be well distributed and effectively contacted with the contents of each reaction zone, especially the early ones, and the calcium carbonate and other solids maintained in suspension therein. Accordingly, the mixing action must be turbulent with large fluid displacement.

With very high ferrous iron solute concentration (e.g. approaching saturation ferrous sulfate at about 20% concentration), low air rate, and turbulent agitation, one can expect quite rapid and efficient use of air. Conversely, as the soluble ferrous iron concentration approaches zero, so does oxygen uptake. Hence, for efficiency and economy, it is incumbent to reduce air input stepwise in the successive sludging reactors as oxygen demand decreases, however maintaining turbulence and suspension of solids in every such slurry reaction zone. With ferrous sulfate concentration at about 3% and ambient room temperature conditions of 60°–70° F. (15°–21° C.) one can expect at best about one-third consumption of the oxygen of incoming air; in such overall reactor series at least about 10 times the stoichiometric oxygen then is advantageous, and this factor can reach 20–100 or even more in such operation whereby effective carbon dioxide stripping, assistance in maintenance of particle suspension, and oxidation of practically all the soluble ferrous iron can be effected with this "free" reactant at the expense of its compression cost.

The calcium carbonate represents a greater operating cost, hence it is ordinarily of special advantage to keep the excess over the stoichiometric as low as practical. Advantageously at least about 3% excess and preferably about 5–15% excess of the stoichiometric is highly effective with ferrous sulfate concentrations of 2% or more in the feed, and rarely is it necessary to go farther than 1.4 times the stoichiometric for practical sludge-forming purposes with such feed. With feeds very dilute in ferrous sulfate, however, one might find it economical to use higher calcium carbonate levels to save on agitation and compression costs.

It is well known and logical that the calcium carbonate for this purpose should be very fine. By "impalpable" is meant grit-fee, i.e., not above about 44 microns in particle size and preferably finer than that. The calcium carbonate preferably is ground aragonite ore or ground oyster shell for highest chemical activity, aragonite being the more active of these two, although it is also possible to use for the sludging operation such finely ground limestone of high reactivity providing that it has only trifling (a few percent maximum) dolomitic (magnesium, and other than calcium metal) content.

Ground aragonite will precipitate ferrous iron as carbonate or hydroxide. However, the reaction is too incomplete for the instant pollution control purposes; hence, the ferrous iron must be oxidized to ferric iron substantially completely to remove it and produce a good quality water effluent. Accordingly, "sludging" in the sense used here must include oxidation of the ferrous iron to ferric fairly completely as an essential feature. In this application the term "sludge" means the substantial water-insoluble iron-bearing solids made by this process and "sludging" means converting almost all of the iron solutes of the feed into a virtually water-insoluble sludge.

While it has been known for a long time that a highly reactive grade of calcium carbonate is a much cheaper reactant for the instant purposes than is hydrated lime or quicklime, the more sluggish performance of calcium carbonate heretofore seems to have detracted markedly from sustained commercial utility of related processes using it, especially where there is appreciable ferrous sulfate solute present. It should be noted that conventional grinding methods for the calcium carbonate, such as preferably wet ball mill grinding, but also ring roller milling, hammer milling, fluid energy milling, or a combination of such methods are adequate for the instant purposes, and the calcium carbonate need only pass a 325-mesh sieve (U.S. Standard) to be quite satisfactory. Exotic grinding equipment and elaborate pulverizing schemes are not needed, but of course can be used as is necessary or desirable.

The temperature for the instant sludging operation, for efficiency and economy, preferably is about ambient indoor temperature, which broadly is about 10° to 45° C., generally about 15° to 40° C., and more typically about 15° to 21° C. There will be some heat of reaction in both the sludge-forming process and in a primary neutralization process, if practiced; this should be helpful but is not appreciable in normal operation. While elevated temperatures can be used, e.g. 50°–70° C., these appear to be economic only if and when a source of cheap waste heat is available for the purpose. Naturally, the reactions will go faster when the temperature is elevated, permitting limestone to be used well and the reactors can be made smaller.

The operation preferably is performed at atmospheric pressure for efficiency and economy. While it is conceivable that reduced pressure over the sludging series of reactors would be advantageous for removal of carbon dioxide, the additional construction cost does not appear to be generally worth it, and carbon dioxide is stripped adequately at atmospheric pressure to drive the reaction.

Superficial residence time in a series of reactors herein simply is the quotient of volume of all such reactors divided by the volumetric flow therethrough per hour. In the sludge-forming reaction practiced here such superficial residence time desirably is at least about an hour and this can extend up to about 15 hours. For conservative purposes, the superficial residence time is advantageously about 5–6 hours, though elevated temperatures can decrease these figures. Recycle of some coarser sludge slurry through at least part of the sludging reactors is desirable to obtain maximum efficiency from the calcium carbonate, although this reduces residence time in such reactors. It is preferred to recycle about as much of such sludge as is being withdrawn as product, and even more can be recycled at times if desired.

Because the reaction rate decreases markedly as the temperature lowers, some compensation for such lowering, in the absence of providing additional heat, includes longer residence time, turbulent agitation at all times, and/or additional alkali (calcium carbonate) to compensate for the loss of rate. This invention is designed conservatively to operate effectively at ambient indoor temperature with relatively little excess of such alkali. Increasing pressure or liquid head will increase the driving force for absorbing oxygen into the mixture, but also decrease the efficiency of stripping carbon dioxide. In most circumstances oxygen transfer is the controlling situation, so liquid head should be at least a few feet and up to about 20 feet. Freeboard for some foaming in the sludging reaction clearly is desirable, as are provisions for mechanically beating foam down or spraying it down with liquid sprays (such as recycle flows), or even the use of classical defoaming agents such as silicones where necessary or desirable.

Recycle of a portion of the coarser solids fraction of the sludge (advantageously as a stream slurry) to the sludging reaction helps to create a sludge that is readily handled and classified into fractions. In general, about 10% to 70% or even more of such coarser solids fraction (reckoned on a dry weight basis) is advantageous to produce such coarser fraction efficiently, and preferably such recycle is about half. This also improves the settling or clarifying operation. Such sludge classification and recycling also appears to direct a higher concentration of iron into the finer sludge whereon enhanced recovery of such iron can be practiced. In general, at least about 10% by weight of the coarser sludge solids should have particle size of at least 44 microns (325 mesh), advantageously at least about 25%, and preferably at least about 40%; and desirably at least about 10% by weight of the coarser sludge solids will be greater than about 63 microns (230 mesh). Broadly, then, such sized particles (of at least 44 microns) range from about 10% to 90%, advantageously 25% to 75%, and typically about 40% to 60% by weight of the recycle as the invention is practiced in the Example.

The classification of sludge solids most simply is done continuously by use of one or more centrifugal-type separators (e.g., "hydrocyclones") operating on a slurry stream, although other conventional hydraulic classifiers such as double cones, spitzkasten, or screens, etc., could be adapted, if desired. Such hydrocyclone centrifugal classification can be staged for obtaining a plurality of slurry fractions with solids of various general coarseness and fineness. The ultimate separation of finer sludge preferably is done by sedimentation in a continuous settler such as a Dorr thickener. (Banks of continuous rotary vacuum filters, settling ponds, or the like also could be used.) A representative treated effluent water ex sulfate process will have the following analysis: pH 6-8, total Fe less than 1 ppm, Mn 95 ppm, Cr less than 1 ppm, solution saturated with gypsum (about 2 grams per liter), solution clear and bright. If desired, solids content in effluent water can be reduced to a minimum by a polishing filtration thereof, say, using a Sweetland-type filter or plate-and-frame filter press with the filter media precoated with filter aid, e.g. diatomaceous silica.

The coarser sludge solids withdrawn from the process are dewatered by filtration quite readily and effectively to produce solids or solids filter cake (which can be dried further, if required) which is easy to handle and transport. Alternatively, the sludge solids can be dewatered by self-draining. Such good self-draining properties of these solids contributes to their ease of filtration. Self-draining operations can save investment in filtration equipment, operation, and maintenance and can be an important process feature. Thus, large heaps of the coarser sludge solids desirably will dewater by self-draining in about a week's time to contain not more than about 15% to 25% water by weight (with perhaps the lower few feet of the heaps remaining rather wet due to capillary action drawing water up into the heap).

The coarser sludge solids, and primary gypsum particles from primary neutralization if such are made, typically can range up to about 300 to 400 microns in length, though it is possible that such particles may grow up to 1,000 to 5,000 microns or more in length. The average particle size by weight of such particles is, of course, smaller, being about 40 microns as the invention is practiced in the Example. The finer sludge solids are those sludge solids remaining after separation of the coarser solids from the sludge stream exiting the sludging operation. Though crystal size of the coarser sludge solids is a factor in determining the dewatering properties of such solids, this factor alone is not determinative. Rather, the crystal configuration and crystal size distribution are two further important factors to be taken into account along with the crystal size. The coarser sludge solids produced by the instant invention tend to be not excessively acicular in shape so as to maintain their practical self-draining and easy filtering qualities while preserving an acceptable bulk density. Also, crystal size distribution patterns of the coarser sludge solids are on the narrow side, which adds to their self-draining qualities.

The various combinations of these factors which give rise to the good dewatering properties of the coarser sludge solids need not be rigorously defined (even if such were an easy task), but rather successful practice of this aspect of the process can be achieved by focusing upon the results desired. That is, the sludge is classified into coarser and finer streams, and sufficient coarser sludge recycled to provide a convenient concentration (quantity) of seed crystals of the advantageous size (and distribution) to impart the rapid dewatering properties to the coarser sludge fraction withdrawn from the process. As indicated above, such rapid self-draining solids also are desirable for ease of filtration.

Of further note is that the ferric hydroxide, the major component of the finer sludge solids, appears to be about 1 micron average particle size, though such particles can form loose agglomerates which are readily broken during hydrocycloning operations. It was quite surprising to discover that the ferric hydroxide-rich finer sludge was easily filterable and certainly much more filterable than ferric hydroxide precipitated in higher pH operations using lime.

The sludge drainage (either from filtration or self-draining) conveniently can be collected, along with filtrates, and returned to the settler or other processing apparatus to confine whatever solids they may have to the system. The treated water effluent from the settler can be a grinding vehicle for the calcium carbonate. For simplicity of operation, the coarsest grind is recirculted as a slurry to the grinding operation, and the middlings and finer calcium carbonate particles are reclassified, with the finest fraction going as a slurry to the sludge-producing secondary neutralization operation while the coarser fraction (pass 200 mesh) goes as a slurry to primary neutralization.

The effluent from such primary neutralization, or the whole waste stream itself if such primary neutralization is not to be practiced, is fed to the first of a series of sludging reaction zones communicating serially with each other. For economy these can be built on or into the ground as a single, large, boxy structure subdivided into compartments for forming the interconnecting series of mechanically agitated reaction zones as shown in the drawing. The inlet waste stream to be subjected to the sludging reaction advantageously is fed to the first sludging reaction zone of the series, but it should be evident that such flow can be distributed to the whole series and particularly to the first few where reaction is likely to be the most intense. The feed of impalpable calcium carbonate, e.g., aragonite, can be handled similarly with preference given to adding it all to the first reaction zone of the series to establish an alkaline mode of reaction promptly. The recycled flow of coarser sludge solids advantageously is added all to the first sludging reaction zone also for simplicity in ensuring the presence of abundant matrices for sludge formation, although distribution of such diluting flow also can be practiced, particularly over the first few reactors. Air (oxygen) advantageously is fed to all reaction zones of the series to help drive the reaction with least expense, strip carbon dioxide, and assist mixing (which cannot be overemphasized as being turbulent flow mixing for all but at most a final holding for touch up zone or zones, preferably with little or no vortexing). It should be understood that while the description herein details the preferred operational mode of the process using a multiplicity of reaction zones, the process can be designed and operated with a single reaction zone in a batch-type operation. Also, intermediate modes or so-called "semi-continuous" operations ca be practiced.

In primary neutralization, the free sulfuric acid in the waste stream is at least partially neutralized with calcium carbonate, dolomitic limestone, or the like to produce a "chemical" gypsum. Care must be taken, though, not to precipitate iron (or an iron-containing compound) which would contaminate the gypsum product. A variety of primary neutralization processes have been published and little need be said about it here.

The aqueous effluvia resulting from the separation of the gypsum from primary neutralization can contain very fine gypsum as well as the other compounds and materials typical of the waste streams treated by the instant process. Such gypsum fines, normally of less than about 10 microns average particle size preferably are left in the stream fed to the instant process. The concentration of such fine gypsum in the stream exiting primary neutralization and fed to the instant process ranges from about 1 to about 15 grams per liter. An aqueous ferrous sulfate waste stream subjected to a primary neutralization operation and the primary effluent fed to the instant process also would contain the following metal ion impurities typically (in gram/liter): $Fe=8.81$, $Al=0.49$, $Mg=0.51$, $Cr=0.02$, $V=0.08$, and $Mn=0.28$. This analysis is representative and not limitative of the present invention, and subject to variation depending upon initial concentration of metal ions entering a primary neutralization operation; quantity of water added in alkali slurry and from adventitious sources such as rainwater, etc; and the like. The concentration of such metal ion and other impurities in the aqueous primary effluent generally is about 15 to 30 gpl and about half of this is the fine gypsum.

In the following example, reference is made to the drawing. It is the basis of design for a commercial processing plant treating about 645 gallons per minute (about 2,440 liters per minute) of a composite aqueous waste stream fed at about 20°-25° C. from a sulfate process titanium dioxide pigment manufacturing works, but the example should not be construed as limiting the invention. In this specification all parts are parts by weight, all percentages are weight percentages, and all units are in the metric system unless otherwise expressly indicated. All percentages and fractions reckoned on a dry weight basis are measured after drying the material at 43.3° C. The example illustrates a typical sustained operation, but it should be understood that considerable flexibility is afforded this equipment for expected variations in waste flow quality and quantity, temperature, breakdown of equipment, and other exigencies expected from time to time.

EXAMPLE

The mildly acidic waste liquor feed stream is representative of normal operation and is the effluent of a primary neutralization operation wherein the free sulfuric acid is neutralized with calcium carbonate (aragonite) to produce a chemical gypsum product. The feed stream to the present process contains typically about 3% dissolved ferrous sulfate and various other soluble metallic sulfates in minute amount which substantially pass through the primary neutralization operation in amount and in form ($TiOSO_4$—0.3%, $MnSO_4$—0.09%, $Al_2(SO_4)_3$—0.4%, $MgSO_4$—0.4%, $Cr_2(SO_4)_3$—0.01%, $VOSO_4$—0.03%, and $CaSO_4$—0.03%). The feed stream is at a pH of about 4–5 (about 0.01% free sulfuric acid).

Also fed to the process are the various streams collected from the primary neutralization operation which contain uncollected gypsum fines (eg. primary gypsum product filtrate, etc.). Such gypsum fines can pass through conventional filtration and other separation equipment—such fines being of particle size of less than about 10 microns and mostly in the 1–15 micron particle size range. Entry of such fines into the process can enhance efforts towards their recovery.

Referring to the drawing, waste stream 41 (from the primary neutralization operation) passes into reaction zone 42a at the rate of 2860 lpm and contains 125 kg/min of gypsum fines. Reaction zone 42a is the first compartment of a re-enforced concrete sludge-making atmospheric pressure reactor series, collectively "item 42". Filtrate from filtration of the gypsum product made in primary neutralization also is fed into reaction zone 42a at the rate of 42 gpm (159 lpm). Each compartment of item 42 is equipped with a single four flat-bladed turbine agitator having the turbine element mounted on a central vertical shaft. While item 42 is shown as a series of ten compartments overflowing from right to left for two-dimensional depiction, in actual fact zones 42a and 42b are side-by-side in rectangular side-by-side egg-carton arrangement with 42a overflowing into 42b. Zone 42b overflows into 42c, which in turn is paired side-by-side relationship with 42d. Thus 42e and 42f are so paired, as are 42g and 42h, and 42i and 42j. The flow goes from one to another to their alphabetical order.

These reaction zones (working volumes about 105,00 liters each) are square in cross-section, 4.58 meters on a side by 5.03 meters high, and each is equipped with various other interconnections, access holes and windows not shown to take care of exigencies which might crop up from time to time. Each compartment is fed with air entering the system through line 43, header 44 thence subdivided through lines 44a, etc., to each individual compartment (sludging reaction zone).

Fine aragonite (325 mesh) is fed in a slurry through line 46 and it can be added through several lines to sludging reaction zones 42a etc. In this particular operation, however, about 71 kg. per minute of aragonite solids are added all through line 46a to zone 42a only. The volumetric flow rate of the aragonite slurry is 115 gpm (435 lpm).

Compressed air enters header 43 at about 4,200 SCFM (measured at 70° F.) and one atm. total pressure (about 11,900 lpm at 21° C. and 1 atm.). The air rate through line 44a to zone 42a is 1,000 SCFM (28,300 lpm), and through line 44b to zone 42b is 1,000 SCFM. It is 500 SCFM (14,160 lpm) through line 44c to zone 42c, 500 SCFM through line 44d to zone 42d, and 2000

SCFM (5,664 lpm) each through line 44e to zone 42e, through line 44f to zone 42f, through line 44g to zone 42g, through line 44h to zone 42h, through line 44i to zone 42i, and through line 44j to zone 42j.

Overflow from zone 42j is passed through line 47 into hydrocyclone 48. Coarser sludge slurry, rusty brown in color, discharges from hydrocyclone 48 through line 49. About 55 gpm (208 lpm) of this slurry (288 gpl solids) is recycled to compartment 42a through line 50. The balance flows through filter 51. Finer sludge is discharged from hydrocyclone 48 through line 52 into settler 53, a Dorr thickener, 60 feet (18.3 meters) in diameter by 16 feet (4.88 meters) deep—about 1,290,000 liters operating volume—wherein sedimentation occurs. Treated water effluent (about 2,370 lpm) is discharged from settler 53 through line 58, this having the representative analysis set forth above. Sediment (mud) from the settling operation is withdrawn from settler 53 through line 54 and filtered through two continuous rotary vacuum filters in parallel, item 56. The filtrate and washings from such operation are passed through line 57 into settler 53.

The filter cake passes by means of conveyor 60 into pile 61 as finer sludge. Filtrate from primary gypsum recovery (about 42 gpm or 159 lmp) passes through line 59 into compartment 42a, and filtrate from coarser sludge filter 51 passes through line 62, into header 64, and into settler 53.

Representative coarser sludge analysis, dry basis, that can be expected from the exemplified operation is:

| | |
|---|---|
| Gypsum ($CaSO_4 \cdot 2H_2O$) | 77.2% |
| Iron as $Fe(OH)_3$ | 15.2% |
| $CaCO_3$ | 4.8% |
| Al as $Al(OH)_3$ | 2.8% |

It is about 50% coarser than 325 mesh.

Representative finer sludge analysis, dry basis, that can be expected from the exemplified operation is:

| | |
|---|---|
| Gypsum | 23.6% |
| Fe as $Fe(OH)_3$ | 62.0% |
| Al as $Al(OH)_3$ | 10.4% |
| $CaCO_3$ | 3.8% |
| Miscellaneous | .2% |

The proportion of $Fe^{++}$ relative to $Fe^{+++}$ in a sludge from the instant process can be quite variable within a very low range; current experience has shown it to be as low as 0.03% and upwards to about 6%.

Many changes and modifications can be made without departing from the essence of this invention. For example: some solutions extremely dilute in ferrous sulfate can be concentrated by reverse osmosis: a basic waste, e.g. a calcium oxide or hydroxide or sodium hydroxide or carbonate-containing aqueous solution or carbide waste fortuitously available conceivably can be used for neutralizing free sulfuric acid before the sludging operation; and other techniques such as adsubble methods* can be integrated for concentrating, extracting and removing selected components.

* Term proposed by R. Lemlich, Vol. 1, *Recent Developments in Separation Science*, N.N. Li, page 113, 1972, The Chemical Rubber Company, Cleveland, Ohio.

We claim:

1. A process for the treatment of an aqueous ferrous sulfate waste stream, the sulfuric acid in said stream having been at least partially neutralized to make a gypsum product which gypsum product is separated therefrom, which comprises:
   turbulently mixing said at least partially neutralized stream with a recycled flow of coarser sludge solids from a later stage of the process, impalpable calcium carbonate selected from the group consisting of limestone, aragonite, oyster shell or mixtures thereof in at least about 3% stoichiometric excess, and molecular oxygen gas in substantial excess of the stoichiometric proportions required for converting the ferrous iron present in said stream into ferric iron in a slurry reaction zone until virtually complete sludging at a temperature of at least about 10° C. of the iron content of said stream takes place;
   classifying the resulting sludge into a coarser solids fraction of which at least about 10% by weight has an average particle size of greater than about 44 microns and an aqueous suspension of finer sludge solids;
   returning between about 10% and 70% by weight of the coarser solids fraction as said recycled flow;
   separating said finer sludge solids from said aqueous suspension thereof; and
   disposing of the remainder of said aqueous suspension as effluent.

2. The process of claim 1 wherein said reaction zone is a multiplicity of slurry reaction zones communicating serially with each other.

3. The process of claim 2 where the oxygen is in the form of air and in a proportion of at least about 10-100 times the stoichiometric, the calcium carbonate proportion is about 1.03-1.4 times the stoichiometric, and the superficial residence time of said reaction zones is at least about an hour.

4. The process of claim 3 wherein the unrecycled portion of said coarser solids fraction is dewatered by self-drainage, and said unrecycled portion amounts to about half of said fraction on a dry weight basis.

5. The process of claim 3 wherein the unrecycled portion of said coarser solids fraction is dewatered by filtration, and said unrecycled portion amounts to about half of said coarser solids fraction on a dry weight basis.

6. The process of claim 1 wherein between about 10% and 90% by weight of said coarser solids fraction has a particle size of greater than about 44 microns.

7. The process of claim 6, wherein between about 40% and 60% by weight of said coarser solids fraction has a particle size of greater than about 44 microns.

8. The process of claim 1 wherein the calcium carbonate used is aragonite, said waste stream originates from a sulfate process for producing titanium dioxide, and the free sulfuric acid therein is substantially completely neutralized and gypsum separated therefrom before said stream is subjected to the sludging operation, said waste stream containing not more than about 15 g/l of gypsum fines which enter the process.

9. The process of claim 1 wherein the calcium carbonate used is oyster shell, said waste stream originates from a sulfate process for producing titanium dioxide, and the free sulfuric acid therein is substantially completely neutralized and gypsum separated therefrom before said stream is subjected to the sludging operation, said waste stream containing not more than about 15 g/l of gypsum fines which enter the process.

10. The process of claim 1 wherein said sludging is conducted at about 10° to 45° C.

11. The process of claim 9 wherein said sludging is conducted at about 15° to 45° C.

12. The process of claim 11 wherein said sludging is conducted at about 15° to 21° C.

13. A flow process for the treatment of an aqueous ferrous sulfate waste stream from a sulfate process for producing titanium dioxide, the sulfuric acid in said stream having been at least partially neutralized with calcium carbonate and the resulting gypsum separated therefrom, which comprises:

continuously passing said at least partially neutralized stream containing not more than about 15 g/l of gypsum fines, a recycled flow of coarser sludge solids from a later stage of the process, impalpable calcium carbonate selected from the group consisting of limestone, aragonite, oyster shell or mixtures thereof in about 1.03 to 1.4 times the stoichiometric amount, and air in about 10 to 100 times the stoichiometric amount into a series of atmospheric pressure, turbulently agitated reaction zones communicating serially with each other and therein substantially neutralizing any residual sulfuric acid and virtually completely sludging at a temperature of at least about 10° C. the iron content of said at least partially neutralized stream, continuously classifying the resulting sludge into a coarser solids fraction of which at least 10% by weight have average particle size of greater than 44 microns and an aqueous suspension of finer sludge solids;

recycling between about 10% and 70% on a dry weight basis of said coarser sludge solids to the sludging operation;

continuously separating said finer sludge solids from said aqueous suspension thereof;

disposing as effluent the remainder of said aqueous suspension; and recovering the unrecycled portion of coarser sludge solids fraction.

* * * * *

UNITED STATES PATENT AND TRADEMARK OFFICE
CERTIFICATE OF CORRECTION

PATENT NO. : 4,186,088
DATED : Jan. 29, 1980
INVENTOR(S) : Steven J. Fitch, Philip R. Peeling, and David J. Heiser It is certified that error appears in the above-identified patent and that said Letters Patent are hereby corrected as shown below:

Column 8, line 22, change the range "1-15 micron" to read --1-5 micron--.

Signed and Sealed this

Twenty-fourth Day of June 1980

[SEAL]

Attest:

SIDNEY A. DIAMOND

Attesting Officer

Commissioner of Patents and Trademarks